US010113740B2

(12) United States Patent
Fitzsimmons (10) Patent No.: US 10,113,740 B2
(45) Date of Patent: Oct. 30, 2018

(54) FLUIDIZED BED COMBUSTION OF CARBONACEOUS FUELS

(71) Applicant: GAS TECHNOLOGY INSTITUTE, Des Plaines, IL (US)

(72) Inventor: Mark Fitzsimmons, Reseda, CA (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 132 days.

(21) Appl. No.: 15/235,619

(22) Filed: Aug. 12, 2016

(65) Prior Publication Data
US 2018/0045405 A1    Feb. 15, 2018

(51) Int. Cl.
| | | |
|---|---|---|
| *F23C 10/00* | (2006.01) | |
| *C10L 3/06* | (2006.01) | |
| *C10L 5/04* | (2006.01) | |
| *C10L 5/40* | (2006.01) | |
| *F23L 7/00* | (2006.01) | |
| *F23C 10/20* | (2006.01) | |
| *F23C 10/22* | (2006.01) | |

(52) U.S. Cl.
CPC .............. *F23C 10/002* (2013.01); *C10L 3/06* (2013.01); *C10L 5/04* (2013.01); *C10L 5/40* (2013.01); *F23C 10/20* (2013.01); *F23C 10/22* (2013.01); *F23L 7/007* (2013.01); *F23C 2200/00* (2013.01); *F23C 2202/00* (2013.01)

(58) Field of Classification Search
CPC ....................... F23C 2900/10004; F23C 10/22
USPC .......................................................... 431/7
See application file for complete search history.

(56) References Cited

U.S. PATENT DOCUMENTS 3,475,160 A * 10/1969 Saxton ...................... C01B 3/38
                                                       252/373
3,823,693 A    7/1974 Bryers et al.
(Continued)

FOREIGN PATENT DOCUMENTS

DE         10006684       8/2001
WO         WO 81/02057    7/1981

OTHER PUBLICATIONS

PCT International Search Report, Form PCT/ISA/210, dated Aug. 29, 2017, (2 pages).
(Continued)

*Primary Examiner* — Avinash Savani
(74) *Attorney, Agent, or Firm* — Pauley Erickson & Kottis (57) ABSTRACT

Methods and devices for combusting a carbonaceous fuel in an oxy-combustion fluidized bed reactor involving controlling the local oxygen content within the oxy-combustion reactor to specified levels. The carbonaceous fuel and an oxygen-containing gas are introduced into a fluidized bed reactor and eluted through a fluidized bed of an inert material, dolomite or a combination thereof to combust the fuel and oxygen to produce at least $CO_2$ and steam. The oxygen-containing gas is a mixture of oxygen, recycled $CO_2$ and steam and has sufficient oxygen added to the recycled $CO_2$ and steam that the mixture contains 7-20 mole % oxygen. The carbonaceous fuel and the oxygen-containing gas are introduced into the fluidized bed at a location in sufficiently close proximity to each other to avoid producing a reducing atmosphere at the location. At least a portion of the produced $CO_2$ and steam are recycled to the reactor.

23 Claims, 5 Drawing Sheets

(56) References Cited

U.S. PATENT DOCUMENTS

| | | | |
|---|---|---|---|
| 3,890,111 A * | 6/1975 | Knudsen | C10J 3/54 |
| | | | 201/31 |
| 4,597,771 A | 7/1986 | Cheng | |
| 5,588,974 A | 12/1996 | Tiller et al. | |
| 8,807,053 B2 | 8/2014 | Kauppinen | |
| 2004/0103832 A1 | 6/2004 | Gross et al. | |
| 2006/0053791 A1 | 3/2006 | Prentice, III | |
| 2008/0271335 A1 | 11/2008 | Kimball | |
| 2010/0077947 A1 | 4/2010 | Hack | |
| 2010/0307389 A1 | 12/2010 | Stewart et al. | |
| 2014/0065559 A1 | 3/2014 | Jukkola | |

OTHER PUBLICATIONS

PCT Written Opinion of the International Searching Authority, Form PCT/ISA/237, dated Aug. 29, 2017, (9 pages).

* cited by examiner

FLUIDIZED BED COMBUSTION OF CARBONACEOUS FUELS

BACKGROUND OF THE INVENTION

Field of the Invention

This invention relates generally to the combustion of carbonaceous fuels and, more particularly, to such combustion processing in or via a fluidized bed reactor.

Discussion of Related Art

In recent years, such as due to concerns about global climate change, the release of large quantities of $CO_2$ has been phased out, and new power sources have been sought which reduce $CO_2$ emissions. A promising technology called oxy-combustion has been under development in many countries for more than a decade.

Such processing technology commonly employs a reactor consisting of a fluidized bed such as made up of an inert material or dolomite, or a combination of both. A solid carbonaceous, possibly sulfur-containing, fuel is injected into the reactor to be burned with oxygen or air. Recycled flue gas such as primarily composed of carbon dioxide and steam is used to fluidize the bed. $CO_2$ may constitute 65-99% of the fluidizing gas for the bed, and steam may make up the remainder. Conventional oxy-combustion reactors premix all recycled flue gas with 20-30% or as much as 50% oxygen (molar percentage). This is a common generic recipe for oxy-combustion systems which have been proposed for optimized high carbon capture systems for producing power from coal, petroleum coke and biomass combustion.

A considerable amount of heat can be removed during flue gas water condensation if the process is carried out at high pressure, which allows more electrical power to be produced with high quality steam, and boiler feedwater can be preheated with the flue gas condensate. Therefore, a method of performing oxy-combustion at high pressure is highly desired to improve system efficiency.

One implication of performing oxy-combustion in the conventional method described above but at high pressure is that the high oxygen content requires that carbonaceous fuel (such as coal, lignite, petroleum coke or biomass) be injected at a large particle diameter to prevent overheating, and consequently solids have to be circulated outside the bed via cyclones to ensure complete combustion (US 2014/0065559 A1).

Injecting pulverized coal into such a bed as described in patent application US 2010/0307389 A1 will allow complete combustion in a very short time, such that solids do not have to be circulated outside the bed, however this also has a risk that coal particles will burn faster than the heat can be removed and diffuse through the bed to heat transfer surfaces, and this can lead to fouling through slagging agglomeration. Moisture in the fuel has only a limited degree of mitigating effect, and using wet fuel has other detrimental effects on operating cost (more oxygen must be produced, and the solids cannot be handled in a conventional manner when they are not dried.)

SUMMARY OF THE INVENTION

In accordance with one aspect or embodiment, a method of combusting a carbonaceous fuel is provided. The method involves introducing the carbonaceous fuel and an oxygen-containing gas into a fluidized bed reactor. Within the fluidized bed reactor, the carbonaceous fuel and the oxygen-containing gas are eluted through a fluidized bed of an inert material, dolomite or a combination thereof. The fluidized reactor may be staged. The oxygen-containing gas is a mixture of oxygen, recycled $CO_2$ and steam having sufficient oxygen added to the recycled $CO_2$ and steam that the mixture contains 7-20 mole % oxygen, which may be premixed in the first stage. In subsequent stages, the carbonaceous fuel and the oxygen-containing gas are introduced into the fluidized bed at a location in sufficiently close proximity to each other to avoid producing a reducing atmosphere at the location. The carbonaceous fuel reacts with at least a portion of the oxygen-containing to produce at least $CO_2$ and steam. At least a portion of the produced $CO_2$ and steam is recycled to the fluidized bed to form at least a portion of the oxygen-containing gas and to which the sufficient oxygen is added to form the mixture that contains 7-20 mole % oxygen. This may be repeated in additional, further or several stages within the reactor to produce more or additional $CO_2$ and steam such that the total quantity of oxygen which is mixed or blended with the recycled $CO_2$ and steam is greater than and, perhaps, substantially greater than 20%, however in each stage, the amount of oxygen added is no more than 20% to form the mixture that contains 7-20 mole % oxygen.

The invention provides an improved process for combusting a carbonaceous fuel in an oxy-combustion reactor, the improvement involving controlling local oxygen content within the oxy-combustion reactor to up to 20 vol. % but achieving a total oxygen supplied to the system level of more than 20%. This is made possible, at least in part, by injecting oxygen in very close proximity to the fuel injector in subsequent stages of the reactor, e.g., such close proximity may generally correspond to a distance of about 1×-20× the fuel injector diameter.

In accordance with yet another aspect or embodiment, there is provided a processing system that includes a fluidized bed reactor wherein a carbonaceous fuel and an oxygen-containing gas are eluted through a fluidized bed comprising an inert material, dolomite or a combination thereof. The oxygen-containing gas includes a mixture of oxygen, recycled $CO_2$ and steam having sufficient oxygen added to the recycled $CO_2$ and steam that the mixture contains 7-20 mole % oxygen. Further, in the system, the carbonaceous fuel and the oxygen-containing are injected into the fluidized bed at a location in sufficiently close proximity to each other to avoid producing a reducing atmosphere (e.g., 0% oxygen) at the location.

As used herein, references to "local" when used in reference to oxygen content, environment and the like are to be understood to generally refer to a stage of the reactor, which would include a distance which is approximately 40×-60× the diameter of fuel and oxygen injection.

Other objects and advantages will be apparent to those skilled in the art from the following detailed description taken in conjunction with the appended claims and drawings.

BRIEF DESCRIPTION OF THE DRAWINGS

Objects and features of this invention will be better understood from the following description taken in conjunction with the drawings, wherein.

DETAILED DESCRIPTION OF THE INVENTION

The subject development provides a method of combusting carbonaceous fuel in a way that is different than the current state of the art in oxy-combustion.

Figure 1:
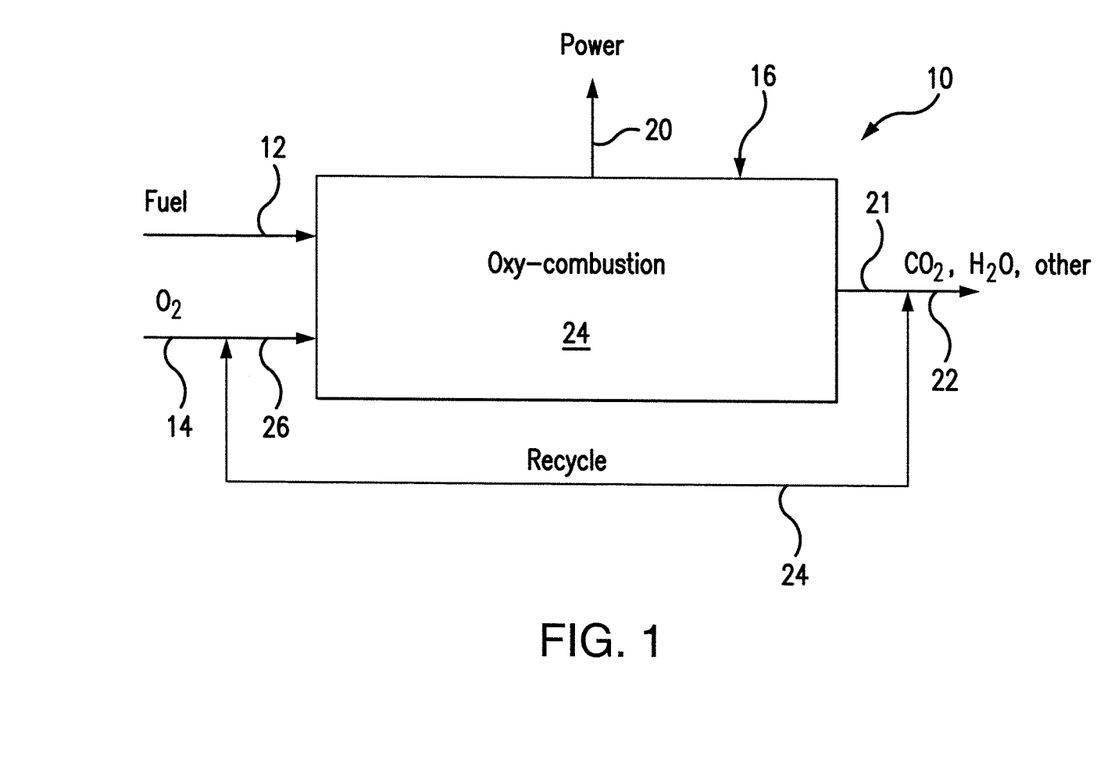
FIG. 1 is a simplified schematic diagram of a processing system in accordance with one aspect of the subject development.

FIG. 1 is a simplified schematic diagram of a processing system, generally designated by the reference numeral 10, in accordance with one aspect of the subject development. As shown, a carbonaceous fuel, via a line 12, and oxygen, via a line 14, are respectively introduced into, e.g., injected into, an oxy-combustion reactor system 16 in accordance with the subject development. The oxy-combustion reactor system 16 can desirably produce or generate power, such as represented by a line 20, and product gases such as $CO_2$, $H_2O$ (e.g., steam) and others, such as represented by a line 22. At least a portion of the reactor system product gases represented by the line 21 can be recycled back to the oxy-combustion reactor system 16 such as represented by the line 24.

In accordance with one aspect of the development, oxygen is injected into a mixture of recycled $CO_2$ and steam, so that the blend of oxygen, $CO_2$ and steam, e.g., line 26, is made up of at least 7 mole % oxygen and no more than or up to 20 mole % oxygen and, in some cases, in a relative amount of up to 18 mole % oxygen, or in accordance with certain preferred embodiments more preferably at least 9 mole % oxygen and up to 12 mole % oxygen. An appropriate amount of fuel is injected as well so that the fuel may burn completely, e.g., the process is run fuel lean. As will be appreciated by those skilled in the art and guided by the teachings herein provided, advantageously the fuel and oxygen are injected in sufficiently close enough proximity to one another such that devolatization burning (e.g., devolatization referring to the hydrocarbon content of the fuel) can take place prior to oxygen depletion via mixing, then no reducing atmospheres will be produced at that location. In one embodiment, the proximity distance required to achieve the devolatization is desirably less than 500 mm, and may preferably be less than 150 mm and, in some embodiments, even as low as 100 mm, which may be achieved if the fuel is pulverized to a sufficient degree, for example, a standard industrial coal grind of 70% less than 200 mesh, with a top size less than 1 millimeter, or preferably, less than 300 microns. So, for example, a fuel supply line of 20 mm could have a vertical proximity distance of roughly 150-400 mm in which devolatization would take place. The proximity distance may be greater in the horizontal direction if injector jets include a horizontal injection component, which can be desirable for distribution and to keep the number of injectors low, and to reduce the vertical proximity distance. This horizontal proximity distance could cover a range from 150-600 mm, with a preferred range of 250-300 mm, which may be controlled by choosing an appropriate velocity of the jets for injection of fuel and oxygen.

Reducing atmospheres are highly corrosive and typically require the incorporation and use of expensive alloys and/or expanded or larger "keep out" zones for metal parts in the combustion reactor. Thereafter, the remaining combustion of the carbonaceous fraction (called "char") can take place in a diffusion-limited reaction, in which oxygen diffuses to the particle as carbon dioxide diffuses outward from the particle, and in this diffusion-limited burning, the particle does not overheat and melt. The net effect of these measures is fast reaction rates that can be balanced with heat removal devices because the "keep out" zones can desirably be maintained relatively small.

The carbonaceous fuels are solids in accordance with certain embodiments. For example, suitable such carbonaceous fuels may include coal, petroleum coke, biomass and the like or combinations thereof.

The carbonaceous fuels are gases in accordance with certain embodiments. For example, suitable such carbonaceous fuels may include natural gas.

After combustion but before the flue gas leaves the fluidized bed, the reactor may be staged, repeating these molar percentages in succession in order to avoid or prevent overheating of the fuel particles, such as can result in slagging.

Figure 7:
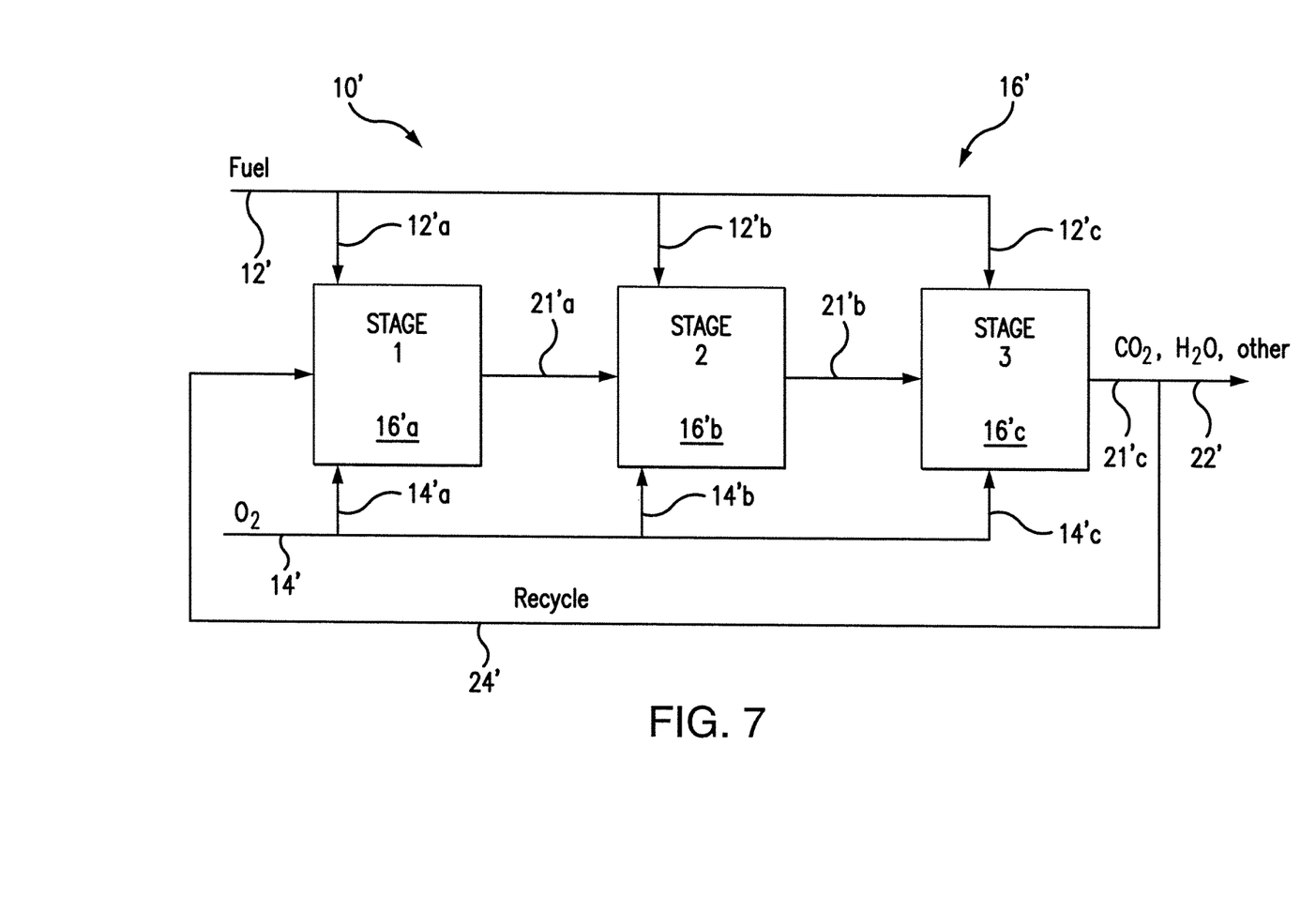
FIG. 7 is a simplified schematic diagram of a multi-stage processing system in accordance with one aspect of the subject development.

FIG. 7 is a simplified schematic diagram of a multi-stage processing system, generally designated by the reference numeral 10', in accordance with one aspect of the subject development. The processing system 10' is somewhat similar to the processing system 10, described above, with similar items being similarly numbered with the addition of an "'".

As shown, a carbonaceous fuel, via a line 12', and oxygen, via a line 14', are respectively introduced into, e.g., injected into, an oxy-combustion reactor system 16' in accordance with the subject development. The oxy-combustion reactor system 16' is a multi-stage reactor system composed of stages 16'a, 16'b and 16'c. The oxy-combustion reactor system 16' can desirably produce or generate power and product gases such as $CO_2$, $H_2O$ (e.g., steam) and others, with the products gases represented by a line 22'.

In FIG. 7, the oxy-combustion reactor system 16' is shown with product gases from the first stage 16'a depicted as passing via a line 21'a to the second stage 16'b; products gases from the second stage 16'b depicted as passing via a line 21'b to the third stage 16'c; and product gases from the third stage 16'c depicted as passing via a line 21'c. At least a portion of the reactor system product gases 21'c can be recycled back to the oxy-combustion reactor system 16' such as represented by the line 24'.

In accordance with one aspect of the development, sufficient oxygen, e.g., 14'a, 14'b, and 14'c is added such that the oxygen mole percent at the beginning of each stage can be as high as 20 mole %, as high as 18 mole %, or as high as 16 to 18 mole %. The added oxygen and recycled $CO_2$ and steam may, if desired, be premixed in the first stage. In accordance with certain preferred aspects of the development, the oxygen mole percent at the beginning of each stage can be in a range of at least 8 mole % and up to 12 mole %. The remnant oxygen content at the end of each stage is preferably less than about 3 mole % and, more preferably about 1 mole %.

Further, the number of stages may be 2, 3 or 4, or greater, but more stages add to complexity and cost. To limit design complexity and cost as well as to minimize pressure losses for the bed fluidization gas (e.g., recycled flue gas), 2-3 stages is a typically preferred number of stages. In practice, the number of stages is typically selected dependent on the distance for devolatization and combustion reactions, which is dependent on the fuel type and can be determined through experimentation with the fuel of interest. The resultant number of stages will dictate the compression work which must be done on the flue gas to fluidize the bed.

At the end of the last stage, the combined gases will preferably retain 0.7 mole % to 1 mole % oxygen, which simplifies gas cleanup while preventing CO formation, but minimizes oxygen overproduction. In between stages, however, the flue gas may contain up to 3-5 mole % oxygen to prevent, avoid or minimize damage to internals.

The oxy-combustion method of combusting carbonaceous materials such as coal faces a number of challenges. For example, in an air blown combustor, the excess oxygen is often as high as 5%, and is commonly so maintained in an effort to avoid reducing atmospheres in the combustor, which are detrimental to metal surfaces. Rather than addressing this issue or concern through the use of certain high alloy materials, which are expensive, or via the injection of excess oxygen, which is also expensive, the subject development allows rapid combustion of such carbonaceous materials with relatively low oxygen levels. The rate of combustion can desirably be accelerated by employing or using very finely pulverized coal in the fluidized bed. The use of finely pulverized coal can, however, lead to very high particle temperatures, even with in-bed heat exchanger surfaces, resulting in slagging and fouling of said bed surfaces. In accordance with a preferred aspect of the subject invention development, the reaction rate can desirably be effectively controlled, reducing particle temperatures by reducing the local oxygen partial pressure such as by controlling the oxygen mole percentage.

In accordance with the subject development, one or more of various approaches or techniques can desirably be employed in controlling the local oxygen molar percentage to be less than 20% or less than 18%, as may be desired such as to moderate the temperatures of burning coal and ash particles. For example, at each stage, oxygen injectors are desirably placed in close proximity to coal injectors, so that their plumes overlap and are well mixed, and well distributed. Thus reducing zones are precluded.

The number of stages may be as few as 2 to 4, or many as 100 or 200 micro stages, each micro stage occupying a local environment of approximately 2-6 cubic feet. Horizontally, the oxygen and fuel mixture can be suitably controlled through a variety of injection arrangements or schemes. For example, in one embodiment, stages can be vertically separated by internal heat exchanger surfaces such as occupy as much as 50% of the cross sectional area and as much as 35% of the gas volume, or as little as 40% of the cross sectional area and as little as 20% of the gas volume.

In one preferred embodiment, the bed material, e.g., dolomite and the carbonaceous material, e.g., coal solid particles, are respectively sized so that they are able to be entrained (e.g., able to be blown out of the reactor) and delivered to filters, cyclones and other flue gas cleanup equipment.

Those skilled in the art and guided by the teachings herein provided will understand and appreciate that operation of oxy-combustion processing employing recycled flue gas as a major constituent of the fluid gas, permits attainment a number of surprising and beneficial results through the proper controlling of the oxygen flow rate as a molar percentage. Primary among these is the tight inverse relationship between oxygen mole percentage and flue gas recycle mass flow, and this has significant consequences. Secondarily is the magnitude of the bed taper. A third surprising result is the relative magnitude of heat which is removable from in-bed heat exchangers and the convective heat exchangers at different molar percentages. This may be viewed as a direct result of the magnitude of the recycle gas flow rate and the enthalpy required to reduce this gas temperature to the recycle gas temperature.

As an example several potential operating conditions are shown in TABLE 1 below, each of which would satisfy a nominal 1 GWth coal flow rate. Final stages typically will receive less oxygen to trim to a final oxygen molar ratio in the flue gas:

TABLE 1

| Stage O$_2$ local mole % (3 stages) | Overall Oxygen mole % in 3 stages | Recycle gas flow rate, tonnes/hour | Bed Taper for constant velocity |
|---|---|---|---|
| 16, 16, 12 | 28% | 790 | 1.28 |
| 12, 12, 9 | 22% | 1146 | 1.18 |
| 11, 11, 8 | 20% | 1291 | 1.15 |
| 8, 8, 6 | 14% | 2073 | 1.08 |

In accordance with one embodiment, a fluidized bed reactor operating with a low local mole percent can attain high overall system mole ratios by increasing the number of stages. For example, the same overall oxygen system balance of 28% can be matched with a system limiting oxygen to 8 or 9% by employing 6 stages.

Although these appear to have different design conditions, a single bed design is capable of being operated over a range of velocities which encompass fluidizing regimes of relatively constant and predictable heat transfer, bubbling activity, void fraction, and low pressure oscillation, all of which can be desirable traits in a fluidized bed. Furthermore, this is merely an illustrative example which assumes that fuel flow rate is the same for all three stages. Designs which alter the ratio of fuel flow between the first, second, third and further stages can be operated in such a way that a single bed diameter and taper can manage a range of flow rates and oxygen mole percent by altering the fuel balance at each stage and by changing the fuel concentration per square meter of bed area. A fluidized bed designed and operated in this way can provide or result in a variety of operation and performance advantageous or benefits including, for example, one or more of improved or increased fuel flexibility, higher turndown capability, and a range of coolant temperature variation when compared to an oxy-combustion system is designed to introduce all oxygen at once and does not stage the combustion. Furthermore, by using a finely pulverized carbonaceous material such as finely pulverized coal, and very high heat exchanger surface area/bed volume ratios, the absolute size of the reactor, such as measured in MW/m$^3$, can be increased several fold.

For example, prior commercial scale in-bed heat exchangers for air blown pressurized fluidized bed combustors used heat exchangers with a volume fraction of 5% to 14% of the fluidized bed. The subject development, in accordance with one preferred embodiment, is designed to have at least 20% or 24% and up to 32% or 35% by volume heat exchangers and smaller diameter tubes, which further decreases the bed volume per megawatt.

The subject development permits fine control of oxygen without detrimentally affecting the bed or carbon burnout at least in part by virtue of one or more of controlled injection and bed baffling. For example, the fluidized bed can contain one or more or a plurality of heat exchangers which perform one or more or several very important functions. The heat exchanger(s) may, for example, serve to remove heat from the combustion process and transfer it to a coolant (working fluids such as steam or supercritical $CO_2$). The heat exchanger(s) may act as bubble breakers to ensure smooth and oscillation-free fluidization. The heat exchanger(s) can act as stage baffles to prevent excessive back-mixing, which is known to result in excessive mass transfer of solids and insufficient solid/gas mixing and residence time, which in turn leads to low carbon burnout and inefficient operation.

Reference is now made to FIGS. 2-6 which illustrate several of the above mentioned arrangements, designs or techniques by which desired mixing of carbonaceous fuel and oxygen can be achieved. All of these arrangements, designs or techniques have the added benefit that they may be inexpensively fabricated such as through the use of the relatively new additive manufacturing method called "Selective Laser Melting", or other similar additive techniques which allow complex shapes to be formed at a fraction of the cost of conventional machining and welding.

Figure 2:
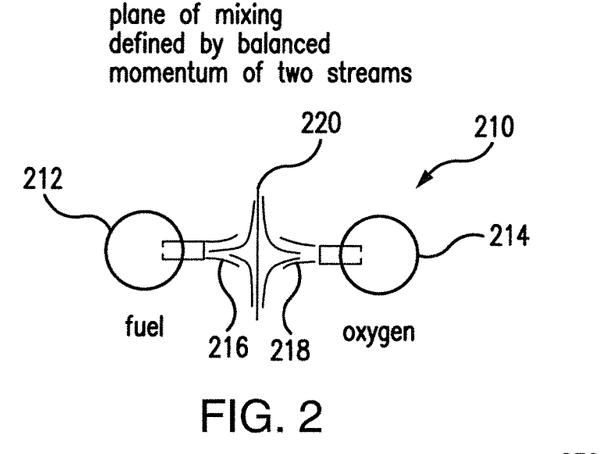
FIG. 2 is a simplified schematic diagram of an arrangement for introducing a carbonaceous fuel and an oxygen-containing gas into a fluidized bed reactor in accordance with one aspect of the subject development.

Turning first to FIG. 2, there is illustrated an arrangement, design or technique, generally identified by the reference numeral 210 and sometimes referred to as an unlike doublet. In the unlike doublet 210, each fuel injector 212 is paired with an oxygen injector 214, so that the fuel injector plume 216 and the oxygen injector plume 218 have matched momentums. The plumes 216 and 218 interact to form a sheet 220 of uniform mixing. Such an arrangement, design or technique can advantageously provide or result in spreading the fuel laterally in the bed, a mixing direction for which fluidized beds are generally known to be poor.

Figure 3:
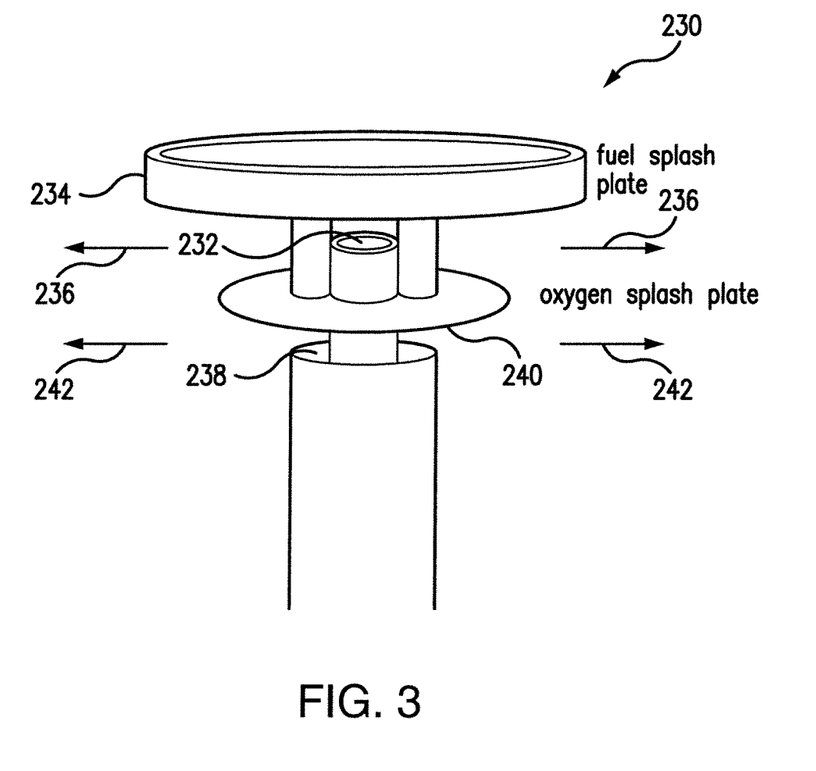
FIG. 3 is a simplified schematic diagram of an arrangement for introducing a carbonaceous fuel and an oxygen-containing gas into a fluidized bed reactor in accordance with another aspect of the subject development.

FIG. 3 illustrates an arrangement, design or technique, generally identified by the reference numeral 230 and sometimes referred to as a coaxial splash plate injector.

In the coaxial splash plate injector 230, the carbonaceous fuel is fed through a central tube 232 to impact a first splash plate 234 and to be redirected to initially flow outwardly in a 360° fashion, generally perpendicular to the central tube 232, such as for in the plane of the page represented by the arrows 236. The oxygen-containing gas is fed through an annular flow path 238 disposed about the central tube 232 to impact a second splash plate 240 and to be redirected to initially flow outwardly in a 360° fashion, generally perpendicular to the central tube 232, such as for in the plane of the page represented by the arrows 242, and parallel the redirected initial flow of the carbonaceous fuel.

In this way, the carbonaceous fuel, e.g., coal and oxygen are both directed into parallel sheets which mix in a shear layer. The momenta of these streams are not matched in the same way that the unlike doublet arrangement shown in FIG. 2 and described above are matched. Instead, these streams are designed so that the velocity of one sheet is approximately double the velocity of the other sheet. This design has the advantage that the carbonaceous fuel conveyed via the central tube 232 is protected or insulated from the heat of combustion by the cooler oxygen gas which flows in the annulus 238.

Figure 4:
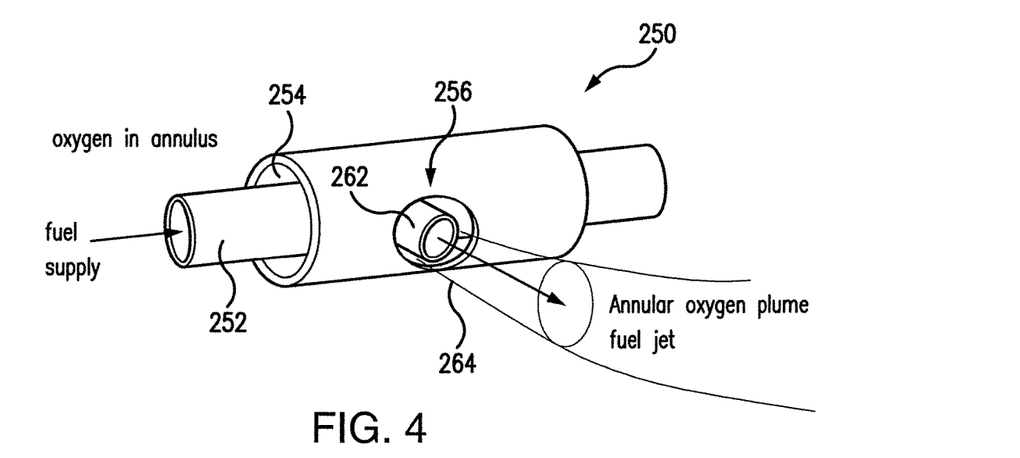
FIG. 4 is a simplified schematic diagram of an arrangement for introducing a carbonaceous fuel and an oxygen-containing gas into a fluidized bed reactor in accordance with another aspect of the subject development.
Figure 5:
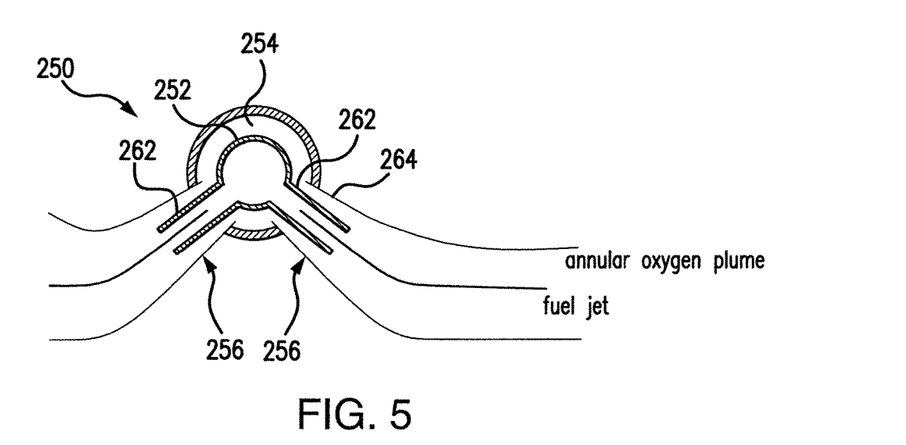
FIG. 5 is an end view of the arrangement for introducing a carbonaceous fuel and an oxygen-containing gas into a fluidized bed reactor shown in FIG. 4.

FIGS. 4 and 5 illustrate an alternative coaxial arrangement, generally designated by the reference numeral 250, for introducing a carbonaceous fuel and an oxygen-containing gas into a fluidized bed reactor. In the arrangement 250, the carbonaceous fuel is fed through a central tube 252 and the oxygen-containing gas is fed through an annular flow path 254 disposed about the central tube 252. The coaxial arrangement 250 further comprising a plurality of side discharge outlets 256 that centrally side discharge a portion of the carbonaceous fuel such as via an outlet 262 while discharging the oxygen-containing gas via an annular plume 254.

The arrangement 250, similar to the coaxial splash plate injector 230 described above, can advantageously serve to protect or insulate the carbonaceous fuel conveyed via the central tube 252 from the heat of combustion by the cooler oxygen gas which flows in the annular flow path 254.

The arrangement 250 may provide or result in that the side discharge outlets 256 can be utilized to produce or result in increased attrition in the fluidized bed. As will be appreciated, fluidized beds are typically designed to avoid or prevent attrition. In the subject development, however, residue from the carbonaceous fuel, e.g., coal ash, and/or the bed material, e.g., dolomite, can preferentially be conveyed or carried out of the fluidized bed by entrainment. In order to increase or maximize sulfur capture potential, the bed material dolomite or limestone particles are preferentially injected at a size that is larger than the largest entrainable particle. However, if these particles are attrited to a size which is then entrainable, the material will not have to be removed through a hot bed ash removal system, but can instead be removed through a filtration system such as after exchanging heat with a convective heat exchanger. This has the advantage of reducing the capital cost of a large bed ash removal system, and the maintenance of these solid handling valves. Also the entrainment of dolomite can act to clean the surfaces of the convective heat exchanger, such as can otherwise become fouled in time with fly ash.

In this coaxial design, the figures depict a single element in a prefabricated condition such as prior to being welded into a longer sparge grid pipe array.

Figure 6:
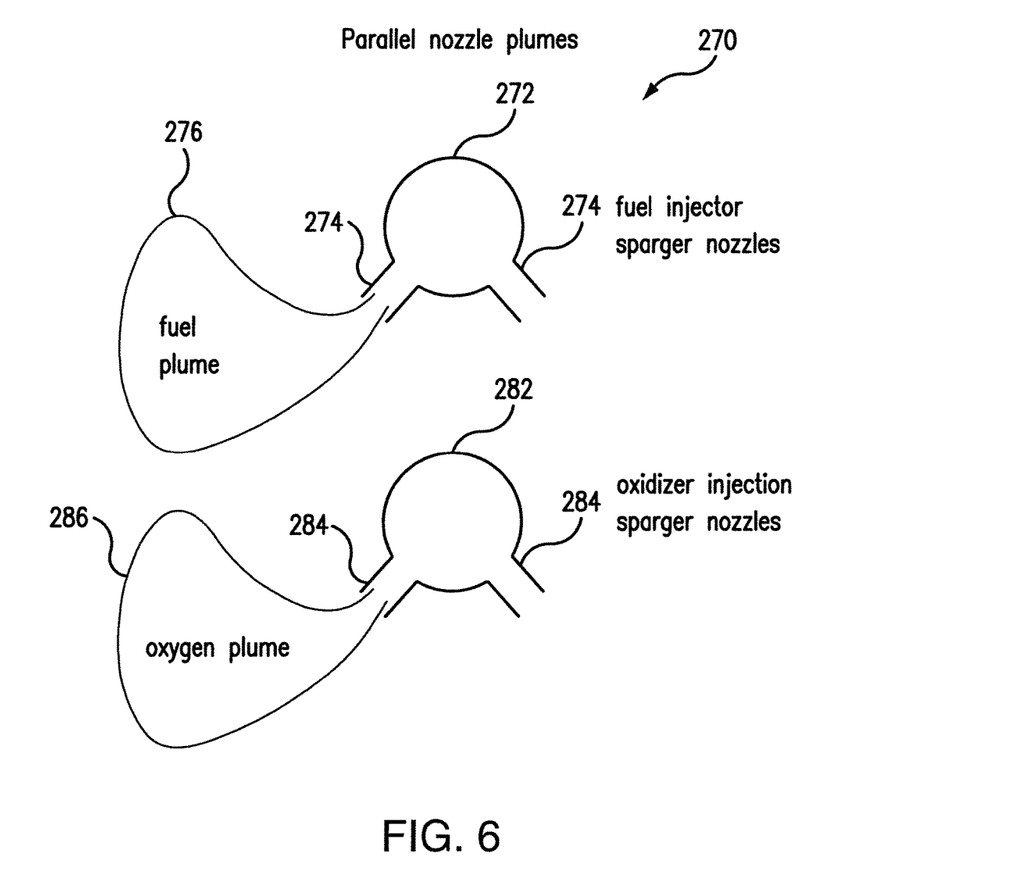
FIG. 6 is a simplified schematic diagram of an arrangement for introducing a carbonaceous fuel and an oxygen-containing gas into a fluidized bed reactor in accordance with another aspect of the subject development.

FIG. 6 illustrate an arrangement, generally designated by the reference numeral 270, in accordance with another embodiment for introducing a carbonaceous fuel and an oxygen-containing gas into a fluidized bed reactor. In the arrangement 270, the carbonaceous fuel is conveyed through a conduit 272 and discharged via the outlets 274 such as forming a fuel plume 276 while the oxygen-containing gas is conveyed through a conduit 282 and discharged via the outlets 284 such as forming an oxygen-containing gas plume 286. As shown, the conduits 272 and 282 are generally in parallel but at different levels or vertical heights, with oxygen being injected below the fuel. In this way, the oxygen plumes are directed into the fluidized bed in a conventional sparger grid fashion, with oxygen being injected below the fuel. Similar to the other designs, these sparger grids can advantageously oxygen and fuel outlets or orifices in a one-to-one ratio.

Thus, in accordance with one aspect the subject development provides methods and systems of injecting oxygen and carbonaceous fuel that improve and/or better control mixing thereof in oxy-combustion processing.

In accordance with another aspect, the subject development provides systems and methods which improve or optimize CO$_2$ capture at relatively low cost and permits attainment of high efficiency, at least in part through the use of staged combustion.

In accordance with another aspect, the subject development permits reductions in reactor size and enables the improved use densely packed heat exchanger surfaces such as to advance one or more of the aims of complete combustion, moderated bed temperatures, reduced capital costs, and reduced waste.

The claims are not intended to include, and should not be interpreted to include, means-plus- or step-plus-function limitations, unless such a limitation is explicitly recited in a given claim using the phrase(s) "means for" or "step for," respectively.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of combusting a carbonaceous fuel, said method comprising:
    introducing the carbonaceous fuel and an oxygen-containing gas into a staged fluidized bed reactor wherein the carbonaceous fuel comprises a solid selected from the group consisting of coal, petroleum coke, biomass and combinations thereof and wherein the carbonaceous fuel and the oxygen-containing gas are eluted through a fluidized bed comprising an inert material, dolomite or a combination thereof;
    wherein the oxygen-containing gas comprises a mixture of oxygen, recycled CO$_2$ and steam having sufficient oxygen added to the recycled CO$_2$ and steam that the mixture in each stage contains 7-20 mole % oxygen, and
    wherein the carbonaceous fuel and the oxygen-containing gas are introduced into the fluidized bed at a location in sufficiently close proximity to each other to avoid producing a reducing atmosphere at the location;
    combusting the carbonaceous fuel and with at least a portion of the oxygen-containing to produce at least CO$_2$ and steam; and
    recycling to the fluidized bed reactor at least a portion of the produced CO$_2$ and steam as a portion of the oxygen-containing gas such that the total quantity of oxygen supplied to the reactor is greater than 20% but the quantity of oxygen supplied in each stage is no more than 20%.

2. The method of claim 1 wherein the carbonaceous fuel comprises natural gas.

3. The method of claim 1 wherein each stage has a beginning having an oxygen mole percent content of at least 7% up to 20% and an end, with the end of each stage prior to the last stage having an end oxygen content of no more than 3 mole % and the end of the last stage having an oxygen content of no more than 0.7-1.0 mole %.

4. The method of claim 1 wherein the fluidized bed reactor comprises at least one in-bed heat exchanger.

5. The method of claim 4 wherein the fluidized bed reactor comprises a plurality of in-bed heat exchangers and the plurality of in-bed heat exchangers occupy 20-35% by volume of the fluidized bed reactor.

6. The method of claim 5 wherein the fluidized bed reactor comprises a plurality of vertically separated stages, wherein at least one pair of adjacent vertically separated stages are separated by internal heat exchanger surfaces.

7. The method of claim 1 wherein said introducing of the carbonaceous fuel and the oxygen-containing gas into the fluidized bed reactor achieves desired mixing of the carbonaceous fuel and oxygen.

8. The method of claim 7 wherein said introducing of the carbonaceous fuel and the oxygen-containing gas into the fluidized bed reactor comprises introducing the carbonaceous fuel and the oxygen-containing gas into the fluidized bed reactor via an unlike doublet in which a fuel injector is paired with an oxygen-containing gas injector wherein the fuel injector and the oxygen-containing gas injector produce plumes of matched momentums and the plumes interact to form a sheet of uniform mixing.

9. The method of claim 7 wherein said introducing of the carbonaceous fuel and the oxygen-containing gas into the fluidized bed reactor comprises introducing the carbonaceous fuel and the oxygen-containing gas into the fluidized bed reactor via a coaxial splash plate injector wherein the carbonaceous fuel is fed through a central tube to impact a first splash plate and to be redirected to initially flow outwardly generally perpendicular to the central tube and the oxygen-containing gas is fed through an annular flow path disposed about the central tube to impact a second splash plate and to be redirected to initially flow outwardly generally perpendicular to the central tube and parallel the redirected initial flow of the carbonaceous fuel.

10. The method of claim 7 wherein said introducing of the carbonaceous fuel and the oxygen-containing gas into the fluidized bed reactor comprises introducing the carbonaceous fuel and the oxygen-containing gas into the fluidized bed reactor via a coaxial arrangement wherein the carbonaceous fuel is fed through a central tube and the oxygen-containing gas is fed through an annular flow path disposed about the central tube, the coaxial arrangement further comprising a plurality of side discharge outlets that centrally side discharge a portion of the carbonaceous fuel with an annular plume of the oxygen-containing gas.

11. The method of claim 7 wherein said introducing of the carbonaceous fuel and the oxygen-containing gas into the fluidized bed reactor comprises introducing the carbonaceous fuel and the oxygen-containing gas into the fluidized bed reactor in parallel and vertically spaced apart.

12. In a process for combusting a carbonaceous fuel in an oxy-combustion reactor, the improvement comprising:
    controlling local oxygen content within the oxy-combustion reactor to less than 20 mole %.

13. A processing system comprising:
    a staged fluidized bed reactor wherein a carbonaceous fuel and an oxygen-containing gas are eluted through a fluidized bed comprising an inert material, dolomite or a combination thereof, wherein the carbonaceous fuel comprises natural gas;
    wherein the oxygen-containing gas comprises a mixture of oxygen, recycled CO$_2$ and steam having sufficient oxygen added to the recycled CO$_2$ and steam that the mixture in each stage contains 7-20 mole % oxygen; and
    wherein the carbonaceous fuel and the oxygen-containing are injected into the fluidized bed at a location in sufficiently close proximity to each other to avoid producing a reducing atmosphere at the location.

14. The processing system of claim 13 wherein each stage has a beginning having an oxygen mole percent content of at least 7% up to 20% and an end, with the end of each stage prior to the last stage having an end oxygen content of no more than 3 mole % and the end of the last stage having an oxygen content of no more than 0.7-1.0 mole %.

15. The processing system of claim 13 wherein the carbonaceous fuel comprises a solid selected from the group consisting of coal, petroleum coke, biomass and combinations thereof.

16. The processing system of claim 13 wherein the fluidized bed reactor comprises at least one in-bed heat exchanger.

17. The processing system of claim 16 wherein the fluidized bed reactor comprises a plurality of in-bed heat exchangers and the plurality of heat exchangers occupy 20-35% by volume of the fluidized bed reactor.

18. A method of combusting a carbonaceous fuel, said method comprising:
  introducing the carbonaceous fuel and an oxygen-containing gas into a staged fluidized bed reactor, wherein the carbonaceous fuel comprises natural gas and wherein the carbonaceous fuel and the oxygen-containing gas are eluted through a fluidized bed comprising an inert material, dolomite or a combination thereof;
  wherein the oxygen-containing gas comprises a mixture of oxygen, recycled $CO_2$ and steam having sufficient oxygen added to the recycled $CO_2$ and steam that the mixture in each stage contains 7-20 mole % oxygen, and
  wherein the carbonaceous fuel and the oxygen-containing gas are introduced into the fluidized bed at a location in sufficiently close proximity to each other to avoid producing a reducing atmosphere at the location;
  combusting the carbonaceous fuel and with at least a portion of the oxygen-containing to produce at least $CO_2$ and steam; and
  recycling to the fluidized bed reactor at least a portion of the produced $CO_2$ and steam as a portion of the oxygen-containing gas such that the total quantity of oxygen supplied to the reactor is greater than 20% but the quantity of oxygen supplied in each stage is no more than 20%.

19. A method of combusting a carbonaceous fuel, said method comprising:
  introducing the carbonaceous fuel and an oxygen-containing gas into a staged fluidized bed reactor wherein the carbonaceous fuel and the oxygen-containing gas are eluted through a fluidized bed comprising an inert material, dolomite or a combination thereof, wherein said introducing of the carbonaceous fuel and the oxygen-containing gas into the fluidized bed reactor achieves desired mixing of the carbonaceous fuel and oxygen, and wherein said introducing of the carbonaceous fuel and the oxygen-containing gas into the fluidized bed reactor comprises introducing the carbonaceous fuel and the oxygen-containing gas into the fluidized bed reactor via an unlike doublet in which a fuel injector is paired with an oxygen-containing gas injector wherein the fuel injector and the oxygen-containing gas injector produce plumes of matched momentums and the plumes interact to form a sheet of uniform mixing;
  wherein the oxygen-containing gas comprises a mixture of oxygen, recycled $CO_2$ and steam having sufficient oxygen added to the recycled $CO_2$ and steam that the mixture in each stage contains 7-20 mole % oxygen, and
  wherein the carbonaceous fuel and the oxygen-containing gas are introduced into the fluidized bed at a location in sufficiently close proximity to each other to avoid producing a reducing atmosphere at the location;
  combusting the carbonaceous fuel and with at least a portion of the oxygen-containing to produce at least $CO_2$ and steam; and
  recycling to the fluidized bed reactor at least a portion of the produced $CO_2$ and steam as a portion of the oxygen-containing gas such that the total quantity of oxygen supplied to the reactor is greater than 20% but the quantity of oxygen supplied in each stage is no more than 20%.

20. A method of combusting a carbonaceous fuel, said method comprising:
  introducing the carbonaceous fuel and an oxygen-containing gas into a staged fluidized bed reactor wherein the carbonaceous fuel and the oxygen-containing gas are eluted through a fluidized bed comprising an inert material, dolomite or a combination thereof, wherein said introducing of the carbonaceous fuel and the oxygen-containing gas into the fluidized bed reactor achieves desired mixing of the carbonaceous fuel and oxygen, and wherein said introducing of the carbonaceous fuel and the oxygen-containing gas into the fluidized bed reactor comprises introducing the carbonaceous fuel and the oxygen-containing gas into the fluidized bed reactor via a coaxial splash plate injector wherein the carbonaceous fuel is fed through a central tube to impact a first splash plate and to be redirected to initially flow outwardly generally perpendicular to the central tube and the oxygen-containing gas is fed through an annular flow path disposed about the central tube to impact a second splash plate and to be redirected to initially flow outwardly generally perpendicular to the central tube and parallel the redirected initial flow of the carbonaceous fuel;
  wherein the oxygen-containing gas comprises a mixture of oxygen, recycled $CO_2$ and steam having sufficient oxygen added to the recycled $CO_2$ and steam that the mixture in each stage contains 7-20 mole % oxygen, and
  wherein the carbonaceous fuel and the oxygen-containing gas are introduced into the fluidized bed at a location in sufficiently close proximity to each other to avoid producing a reducing atmosphere at the location;
  combusting the carbonaceous fuel and with at least a portion of the oxygen-containing to produce at least $CO_2$ and steam; and
  recycling to the fluidized bed reactor at least a portion of the produced $CO_2$ and steam as a portion of the oxygen-containing gas such that the total quantity of oxygen supplied to the reactor is greater than 20% but the quantity of oxygen supplied in each stage is no more than 20%.

21. A method of combusting a carbonaceous fuel, said method comprising:
  introducing the carbonaceous fuel and an oxygen-containing gas into a staged fluidized bed reactor wherein the carbonaceous fuel and the oxygen-containing gas are eluted through a fluidized bed comprising an inert material, dolomite or a combination thereof, wherein said introducing of the carbonaceous fuel and the oxygen-containing gas into the fluidized bed reactor achieves desired mixing of the carbonaceous fuel and oxygen, and wherein said introducing of the carbonaceous fuel and the oxygen-containing gas into the fluidized bed reactor comprises introducing the carbonaceous fuel and the oxygen-containing gas into the fluidized bed reactor via a coaxial arrangement wherein the carbonaceous fuel is fed through a central tube and the oxygen-containing gas is fed through an annular flow path disposed about the central tube, the coaxial arrangement further comprising a plurality of side discharge outlets that centrally side discharge a portion of the carbonaceous fuel with an annular plume of the oxygen-containing gas;

wherein the oxygen-containing gas comprises a mixture of oxygen, recycled $CO_2$ and steam having sufficient oxygen added to the recycled $CO_2$ and steam that the mixture in each stage contains 7-20 mole % oxygen, and wherein the carbonaceous fuel and the oxygen-containing gas are introduced into the fluidized bed at a location in sufficiently close proximity to each other to avoid producing a reducing atmosphere at the location;

combusting the carbonaceous fuel and with at least a portion of the oxygen-containing to produce at least $CO_2$ and steam; and recycling to the fluidized bed reactor at least a portion of the produced $CO_2$ and steam as a portion of the oxygen-containing gas such that the total quantity of oxygen supplied to the reactor is greater than 20% but the quantity of oxygen supplied in each stage is no more than 20%.

22. A method of combusting a carbonaceous fuel, said method comprising:

introducing the carbonaceous fuel and an oxygen-containing gas into a staged fluidized bed reactor wherein the carbonaceous fuel and the oxygen-containing gas are eluted through a fluidized bed comprising an inert material, dolomite or a combination thereof, wherein said introducing of the carbonaceous fuel and the oxygen-containing gas into the fluidized bed reactor achieves desired mixing of the carbonaceous fuel and oxygen, and wherein said introducing of the carbonaceous fuel and the oxygen-containing gas into the fluidized bed reactor comprises introducing the carbonaceous fuel and the oxygen-containing gas into the fluidized bed reactor in parallel and vertically spaced apart;

wherein the oxygen-containing gas comprises a mixture of oxygen, recycled $CO_2$ and steam having sufficient oxygen added to the recycled $CO_2$ and steam that the mixture in each stage contains 7-20 mole % oxygen, and wherein the carbonaceous fuel and the oxygen-containing gas are introduced into the fluidized bed at a location in sufficiently close proximity to each other to avoid producing a reducing atmosphere at the location;

combusting the carbonaceous fuel and with at least a portion of the oxygen-containing to produce at least $CO_2$ and steam; and recycling to the fluidized bed reactor at least a portion of the produced $CO_2$ and steam as a portion of the oxygen-containing gas such that the total quantity of oxygen supplied to the reactor is greater than 20% but the quantity of oxygen supplied in each stage is no more than 20%.

23. A processing system comprising:

a staged fluidized bed reactor wherein a carbonaceous fuel and an oxygen-containing gas are eluted through a fluidized bed comprising an inert material, dolomite or a combination thereof, wherein the carbonaceous fuel comprises a solid selected from the group consisting of coal, petroleum coke, biomass and combinations thereof;

wherein the oxygen-containing gas comprises a mixture of oxygen, recycled $CO_2$ and steam having sufficient oxygen added to the recycled $CO_2$ and steam that the mixture in each stage contains 7-20 mole % oxygen; and wherein the carbonaceous fuel and the oxygen-containing are injected into the fluidized bed at a location in sufficiently close proximity to each other to avoid producing a reducing atmosphere at the location.

* * * * *